July 20, 1965
D. A. WILLIAMS, JR
3,196,335
D.C. - D.C. CONVERTER
Filed June 6, 1960
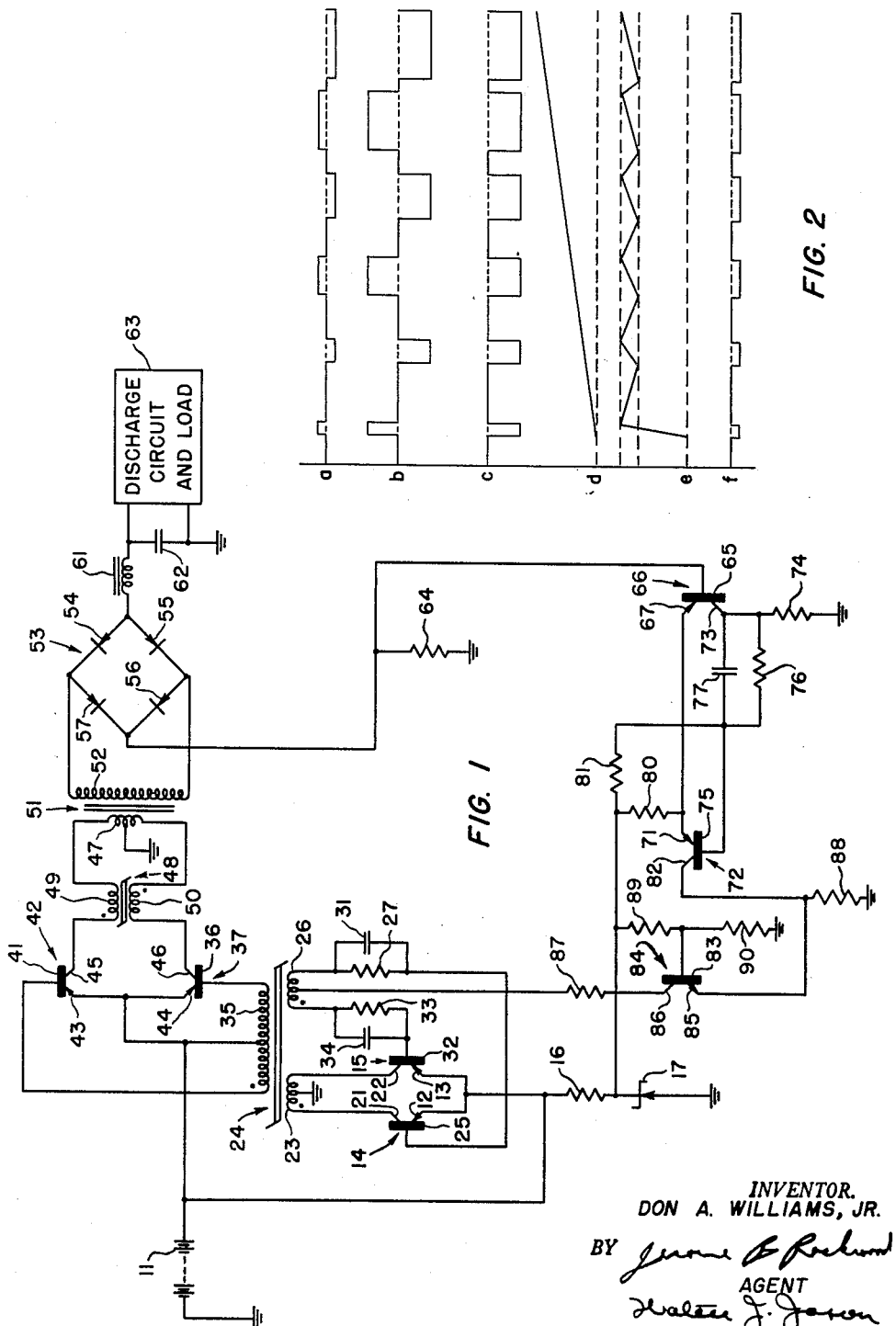
INVENTOR.
DON A. WILLIAMS, JR.
BY
AGENT
ATTORNEY United States Patent Office 3,196,335
Patented July 20, 1965

3,196,335
D.C.–D.C. CONVERTER
Don A. Williams, Jr., San Diego, Calif., assignor to General Dynamics Corporation, San Diego, Calif., a corporation of Delaware
Filed June 6, 1960, Ser. No. 34,288
2 Claims. (Cl. 321—2)

This invention relates to D.C.–D.C. converters, and more particularly to such a circuit adapted to charge a large capacitor with a high direct voltage.

Heretofore, equipment for charging a large capacitor to a high voltage from a low voltage, direct current source as, exemplarily, a battery, have employed low voltage D.C. to high voltage D.C. converters including either a mechanical vibrator or a transistor oscillator connected to the low voltage source, a step-up transformer, and a rectifier. D.C. output from the rectifier is applied across the capacitor, with a current limiting resistor or inductance connected in series with the capacitor to be charged. Such a D.C.–D.C. converter employing a series resistor has a theoretical maximum efficiency of only fifty percent. With a fixed input direct voltage, as from a battery, half the energy from the converter is dissipated by the resistor, and the other half is stored in the capacitor. The peak current drawn from the converter is determined by the resistance value. High resistance lowers the peak current to be supplied by the converter, but lengthens the time required to charge the capacitor. However, it will be apparent that half the energy must always be dissipated by the resistor.

A large inductance may be employed to limit peak current drawn from the D.C.–D.C. converter instead of the resistor. Although substantially no energy is dissipated by a series inductance, a bulky and heavy iron core inductance is required to limit the peak current drawn from the converter to a reasonable value. When a very large capacitor is to be charged, either the charging time must be excessively long and the inductance excessively large in order to limit the peak current, an excessively large D.C. power source and converter must be supplied to furnish the required peak power without overloading.

A further disadvantage of such prior art capacitor charging circuits is the low overall power conversion efficiency of conventional D.C.–D.C. converters. While such devices may be efficient at some fixed current level, they are extremely inefficient at other current levels, dissipating much of the energy from the battery or other power source as heat. Since, during the capacitor charging cycle, current varies from some peak value, determined by the size of the resistor or inductance, to zero during each charging cycle, much of the battery energy is wastefully dissipated as heat. Where batteries must be employed as energy sources, the cost per unit of energy is high, and high efficiency is very desirable. The inefficiency of the prior art devices is, therefore, highly undesirable.

The hereindisclosed capacitor charging device employs an inductance in series with the capacitor. However, in contrast to prior art devices, the inductance may be much smaller. A novel D.C.–D.C. converter, comprising a controlled power pulser and a rectifier, is connected between the low voltage D.C. source and the series inductance-capacitor combination. The ratio between the on time and off time of the controlled power pulser is determined by a control unit responsive to the capacitor load charging current. As a result, there is no large peak of charging current drawn from the energy source and the converter. Load current is held between narrow limits, whereby the converter is operated at the current level of peak efficiency.

It is, therefore, an object of this invention to provide a D.C.–D.C. converter for charging a large capacitor to a high voltage from a low direct voltage source.

Another object of this invention is to provide a capacitor charging circuit drawing a substantially constant current from a low direct voltage source.

Another object of this invention is to provide a D.C.–D.C. converter providing a substantially constant load current.

Another object of this invention is to provide highly efficient means for rapidly charging a large capacitor to a high voltage.

Another object of this invention is to provide a D.C.–D.C. converter having load current sensing means controlling a power pulser.

Another object of this invention is to provide a low D.C. voltage to high D.C. voltage converter for charging a large capacitor to a high voltage at a substantially constant current by means of a feedback circuit including charging current sensing means controlling pulse duration of a power pulser.

Another object of the invention is to provide a capacitor charging circuit which is light, compact, highly efficient, reliable and inexpensive to construct and operate.

These and other objects and advantages of the present invention will become apparent from the following description and from the accompanying drawings, wherein:

FIG. 1 is a schematic diagram of an embodiment of the present invention, and;

FIGURE 2 illustrates waveforms produced at various points in the schematic diagram of FIGURE 1.

Referring now to FIGURE 1, a suitable low direct voltage source, such as battery 11, has a negative terminal connected to ground, and a positive terminal. The positive terminal of battery 11 is connected to emitter electrodes 12 and 13 of transistors 14 and 15, respectively, and to ground through resistor 16 and a Zener voltage regulator diode 17. Collector electrodes 21 and 22 of transistors 14 and 15, respectively, are connected to the ends of first control winding 23 of transformer 24. A center tap on winding 23 is connected to ground. Base electrode 25 of transistor 14 is connected to one end of second control winding 26 of transformer 24 through a resistor 27 and a capacitor 31 connected in parallel. Similarly, base electrode 32 of transistor 15 is connected to the other end of winding 26 through a resistor 33 and a capacitor 34, connected in parallel. Winding 26 is wound in aiding relation to winding 23.

Transformer 24 is furnished with a third output winding 35. Winding 35 is wound in the same sense as windings 23 and 26. One end of winding 35 is connected to base electrode 36 of transistor 37. The other end of winding 35 is similarly connected to base electrode 41 of transistor 42. Emitter electrodes 43 and 44 of transistors 42 and 37, respectively, are connected to a center tap on winding 35 of transformer 24, and to the positive terminal of battery 11.

Collector electrode 45 of power amplifier transistor 42 is connected to one end of primary winding 47 of voltage step-up transformer 51 in serial relationship with winding 49 of saturable reactor 48. Similarly, collector electrode 46 of power amplifier transistor 37 is connected to the other end of winding 47 of transformer 51 through serially connected winding 50 of saturable reactor 48. Primary winding 47 of transformer 51 also has a center tap connected to ground. Secondary winding 52 of transformer 51 is connected across two terminals of a full wave bridge rectifier 53, comprising diodes 54, 55, 56 and 57. One terminal of winding 52 is connected between diodes 54 and 57, and the other terminal is connected between diodes 55 and 56.

The negative D.C. output terminal of bridge rectifier 53, between diodes 54 and 55, is connected to an inductance 61 in series with an energy-storing capacitor 62 and ground. Capacitor 62 has a large capacity, exemplarily, 100 microfarads, and is charged to a high voltage, exemplarily 2,250 volts. A suitable capacitor discharge circuit and load device 63 may be connected across capacitor 62. Exemplarily, the discharge circuit may be an electronic switch which is closed at suitable times to connect the capacitor 62 to discharge through a load, which may be a high intensity flash tube light.

Connected to the positive terminal at the junction of diodes 56 and 57 in bridge rectifier 53 is current sensing resistor 64. Base electrode 65 of a transistor 66 is also connected to bridge rectifier 53 at the junction of diodes 56 and 57. Emitter electrode 67 of transistor 66 is connected to emitter electrode 71 of transistor 72 and to the anode of Zener voltage regulating diode 17 through resistor 80. Collector electrode 73 of transistor 66 is connected to ground through resistor 74, and to base electrode 75 of transistor 72 through resistor 76 and capacitor 77, connected in parallel configuration. Base electrode 75 of transistor 72 is also connected to the junction between resistor 16 and voltage regulating Zener diode 17 through a resistor 81. Collector electrode 82 of transistor 72 is connected to emitter electrode 85 of transistor 84. Transistors 66 and 72 are connected to form a Schmitt trigger circuit, of a type well known to those skilled in the art. Emitter electrode 85 of transistor 84 is connected to ground through resistor 88 as well as to collector electrode 82 of transistor 72. Base electrode 83 of transistor 84 is held positive with respect to emitter electrode 85 by a voltage divider including resistors 89 and 90 connected between the lead maintained at a potential of 12 volts by Zener voltage regulator diode 17 and ground. Collector electrode 86 of transistor 84 is connected to the center tap of winding 26 of transformer 24 through resistor 87.

Upon initial application of power to the circuit, as by connection thereto of battery 11, capacitor 62 is uncharged. A positive polarity voltage from battery 11, exemplarily at a potential of 28 volts, is applied to emitters 12 and 13 of transistors 14 and 15 respectively. No voltage appears across sensing resistor 64 at this time, as illustrated by FIGURE 2e, thereby causing transistor 66 in the Schmitt trigger circuit to be conducting, and transistor 72 to be non-conducting. In this condition, a low voltage appears at collector 82 of transistor 72, and at emitter 85 of transistor 84, connected thereto. Transistor 84 is of the n p n type, with collector 86 connected to the center tap of winding 26 of transformer 24 through resistor 86. Therefore, transistor 84 becomes conductive, and the potential at collector 86 drops, as illustrated by FIGURE 2f, from, exemplarily, 28 volts, to substantially ground potential. Capacitors 31 and 34 remain charged to the previous potential of collector 86. As capacitors 31 and 24 discharge, the potentials at bases 25 and 32 of transistors 14 and 15, respectively, begin to drop.

Since transistors 14 and 15, although of the same type, have slightly different characteristics, one of transistors 14 and 15 will begin to conduct before the other. Assuming transistor 14 begins to conduct first, current will flow from collector 21 to ground through the left half of winding 23 of transformer 24, inducing voltages in windings 26 and 35. The induced voltage in winding 26 is of such polarity as to place an additional positive charge on capacitor 34, increasing the positive potential on the base 32 of transistor 15 to keep it cut off, and applying a negative potential to capacitor 31, thereby lowering the potential applied to base 25 of transistor 14, enabling it to remain in the conductive state.

A negative voltage is simultaneously induced in the right end of winding 35 of transformer 24, and applied to base electrode 36 of transistor 37, causing transistor 37 to conduct. Current flows from battery 11 to emitter 44, collector 46, winding 50 of saturable reactor 48, and the lower half of center-tapped primary winding 47 of voltage step-up transformer 51. Twenty-eight volts applied to half of primary winding 47 is stepped up to 2,250 volts, exemplarily, in secondary winding 52. The junction of diodes 54 and 55 of bridge rectifier 53 furnishes a negative pulse, applied to capacitor 62 through inductance 61 as illustrated by FIGURE 2c. The positive polarity output appears at the junction of diodes 56 and 57. Since capacitor 62 is uncharged, the charging current voltage drop initially appears almost entirely across inductance 61, due to rapid change in current through inductance 61, and the zero potential of capacitor 62. The current through inductance 61 increases substantially linearly with time, the current flowing into, and charging, capacitor 62.

The current which charges capacitor 62, illustrated by the waveform of FIGURE 2e, flows in circuit through current sensing resistor 64 to ground. The voltage drop across current sensing resistor 64, also having the form of FIGURE 2e, is applied to base 65 of transistor 66, a portion of the Schmitt trigger circuit also including transistor 72. Charging current is limited to a predetermined upper limit by suitably proportioning the Schmitt trigger circuit to respond to a voltage representing a predetermined current flowing through resistor 64. Transistor 66 is non-conducting, and transistor 72 is conducting until the charging current reaches the upper, predetermined limit, sensed by the predetermined voltage drop across resistor 64. The base 75 of transistor 72 is biased positive by a voltage divider including resistors 81, 76 and 74, connected between 12 volt Zener diode 17 and ground. Emitters 67 and 71 of transistors 66 and 72, respectively, are biased by resistor 80, connected to 12 volt Zener diode 17. When the charging current voltage drop across resistor 64 rises to the predetermined value, the potential at base 65 of transistor 66 rises, causing transistor 66 to conduct, and lowering the potential at base 75 of transistor 72, cutting off transistor 72.

Cutting off of transistor 72 lowers the potential applied to emitter 85 of transistor 84, cutting off transistor 84, and thereby raising the potential of collector 86, connected to the center tap of winding 26 through resistor 87, as illustrated by the waveform of FIGURE 2c. The increase of potential at the center tap of winding 26 raises the potential of base electrode 25 of transistor 14 sufficiently to cut off transistor 14. The decreasing current in winding 23 of transformer 24 induces a negative potential at the left side of winding 26 and a positive potential at the right end thereof. The positive charge on capacitor 34, connected to the left side of winding 26, is reduced by the negative potential thereat, and capacitor 31, connected to the right side of winding 26, is positively charged by the positive potential thereat. Both transistors 14 and 15 are cut off, as illustrated by FIGURE 2a, and a voltage is no longer induced in winding 35; cutting off transistor 37, as illustrated by FIGURE 2b. Current ceases to flow in primary winding 47 of voltage step-up transformer 51, and the output voltage from rectifier bridge 53 drops to zero, as illustrated by FIGURE 2d. The polarity of the voltage across inductance 61 reverses due to the charge on capacitor 62. The charging current through inductance 61 drops as the magnetic field of the inductance begins to collapse.

As the IR drop through sensing resistor 64 decreases to a predetermined voltage, as shown by FIGURE 2e, the voltage at base electrode 65 of transistor 66 drops sufficiently for transistor 66 to cut off. As transistor 66 cuts off, the other transistor 72 in the Schmitt trigger circuit assumes the conducting state, and causes transistor 84 to conduct, resulting in the waveform of FIGURE 2c.

As transistor 84 conducts, the potential of collector 86 drops substantially to ground potential. As disclosed hereinabove, transistor 14, which had been conducting, was cut off when transistor 84 was cut off, and capacitor 31 was left positively charged, while capacitor 34 was left with substantially no charge thereupon. As a result, the drop in potential at the center tap of winding 26 as transistor 84 conducts causes transistor 15 to conduct, while regeneratively driving the base 25 of transistor 14 highly positive to maintain transistor 14 cut-off. A negative voltage is induced in the left end of winding 35 of transformer 24, applying a negative potential to base electrode 41 of transistor 42, causing transistor 42 to conduct. Collector current flows through winding 49 of saturable reactor 48, and through the upper half of primary winding 47 of voltage step-up transformer 51. The high voltage induced in the secondary winding 52 of step-up transformer 51 passes through diode bridge rectifier 53, applying the negative charging current through inductance 61 to capacitor 62. The capacitor voltage waveform is illustrated by FIGURE 2f.

The charging current flows through the circuit including inductance 61, capacitor 62, resistor 64 and bridge rectifier 53. Since capacitor 62 now is partially charged, as shown by FIGURE 2f, charging current increases less rapidly, and the voltage drop across inductance 61 is smaller. As the charging current increases, the voltage drop across resistor 64 increases as illustrated by FIGURE 2e until, at the preset limit, transistor 66 in the Schmitt trigger circuit conducts, and transistor 72 cuts off. Substantially simultaneously, transistor 84 cuts off, raising the potential of base electrodes 25 and 32 of transistors 14 and 15 as shown by FIGURE 2c, and causing transistor 15 to cut off, completing another cycle.

Saturable reactor 48 is employed to reduce the transient power dissipated by transistors 37 and 42 when turned on. Without the reactor 48, transistor 37 or 42, upon being turned on, immediately carry a current proportional to capacitor 62 charging current at the voltage of battery 11 between the collector and emitter. The emitter collector voltage will then decrease to the normal voltage drop across the emitter-collector resistance. When either of power amplifier transistors 37 or 42 are turned off, a similar situation occurs, since the voltage between the collector and emitter is immediately raised to the full voltage of battery 11, the current remaining constant due to inductance 61 in the load. Upon collapse of the magnetic field about inductance 61, current drops to the normal, minute collector to emitter leakage current. The turnoff peak in power dissipation of transistors 37 and 42 may be removed by making the load resistive, as by placing a resistor and capacitance in series (not shown) across the output terminals of bridge rectifier 53.

While a particular embodiment of the present invention has been disclosed hereinabove, it is to be understood that the present disclosure is intended to be illustrative only, and the scope of the invention should be limited only by the appended claims.

What I claim is:

1. A constant current D.C.–D.C. converter comprising a direct voltage source, a pulsing circuit connected to said direct voltage source for providing variable width, alternate polarity pulses, said pulsing circuit including a transformer having first and second control windings and an output winding, electronic switch means having output electrodes connected to said first control winding and control electrodes, pulse polarity switching means including a parallel resistor capacitor circuit connected to each end of said second control winding and to said control electrodes, a power amplifier connected to said output winding, a rectifier connected to said power amplifier, a load, an inductance connected between said rectifier and said load, a load current sensing resistor connected to said rectifier, and pulse width control means including a voltage responsive trigger circuit connected to said second control winding and responsive to the voltage drop across said load current sensing resistor for controlling said pulsing circuit.

2. A constant current D.C.–D.C. converter comprising a direct voltage source, a pulsing circuit connected to said direct voltage source for providing variable width, alternate polarity pulses, said pulsing circuit including a transformer having first and second control windings and an output winding, electronic switch means comprising first and second transistors having collector electrodes connected to each end of said first control winding and base electrodes, pulse polarity switching means including a parallel resistor-capacitor circuit connected to each end of said second control winding and to said base electrodes, a power amplifier connected to said output winding, a rectifier connected to said power amplifier, a load, an inductance connected between said rectifier and said load, a load current sensing resistor connected to said rectifier, and pulse width control means including a voltage responsive trigger circuit connected to said second control winding and responsive to the voltage drop across said load current sensing resistor for controlling said pulsing circuit.

References Cited by the Examiner

UNITED STATES PATENTS

| | | | |
|---|---|---|---|
| 2,748,274 | 5/56 | Pearlman | 321—2 X |
| 2,806,988 | 9/57 | Sulpizio | 321—18 X |
| 2,849,615 | 8/58 | Gustafson | 321—8 X |
| 2,883,539 | 4/59 | Bruck | 321—8 X |
| 2,950,446 | 8/60 | Humez et al. | 321—2 X |
| 2,987,665 | 6/61 | Thompson | 321—2 |
| 2,991,410 | 7/61 | Seike | 321—2 |
| 2,999,972 | 9/61 | Stroman | 321—2 |
| 3,001,125 | 9/61 | Jensen | 321—2 |
| 3,117,270 | 1/64 | Tailleur | 321—18 |

FOREIGN PATENTS 1,190,868  8/58  France.

LLOYD McCOLLUM, *Primary Examiner.*

SAMUEL BERNSTEIN, ROBERT L. SIMS, MILTON O. HIRSHFIELD, *Examiners.*